United States Patent
Larsen

(10) Patent No.: US 10,927,884 B2
(45) Date of Patent: Feb. 23, 2021

(54) CRANKSHAFT AND METHOD OF MANUFACTURING A CRANKSHAFT

(71) Applicant: Scania CV AB, Södertälje (SE)

(72) Inventor: Per Larsen, Södertälje (SE)

(73) Assignee: SCANIA CV AB

( * ) Notice: Subject to any disclaimer, the term of this patent is extended or adjusted under 35 U.S.C. 154(b) by 0 days.

(21) Appl. No.: 16/617,789

(22) PCT Filed: May 29, 2018

(86) PCT No.: PCT/SE2018/050535
§ 371 (c)(1),
(2) Date: Nov. 27, 2019

(87) PCT Pub. No.: WO2018/226138
PCT Pub. Date: Dec. 13, 2018

(65) Prior Publication Data
US 2020/0096037 A1   Mar. 26, 2020

(30) Foreign Application Priority Data

Jun. 7, 2017 (SE) .................................. 1750715-3

(51) Int. Cl.
*F16C 3/04* (2006.01)
*B21K 1/08* (2006.01)
*F16C 3/08* (2006.01)

(52) U.S. Cl.
CPC . *F16C 3/08* (2013.01); *B21K 1/08* (2013.01)

(58) Field of Classification Search
CPC ...... F16C 3/04; F16C 3/06; F16C 3/08; F16C 3/14; F16C 3/16; B21K 1/08
See application file for complete search history.

(56) References Cited

U.S. PATENT DOCUMENTS 2,378,686 A   6/1945   Carstens
4,015,485 A * 4/1977   Ganter-Ullmann ....... F16C 3/08
                                                        74/596
(Continued)

FOREIGN PATENT DOCUMENTS

CH   383083       10/1964
DE   483381 C  *  9/1929   ................ F16C 3/08
(Continued)

OTHER PUBLICATIONS

Machine translation of EP 2565473 A1 obtained on Feb. 19, 2020.*
(Continued)

*Primary Examiner* — Adam D Rogers
(74) *Attorney, Agent, or Firm* — Ostrolenk Faber LLP

(57) ABSTRACT

A crankshaft (4) with a first central axis (A), has at least two main bearing journals (12), through which the first central axis (A) extends. At least one crankshaft web (10) is arranged between the main bearing journals (12), wherein the at least one crankshaft web (10) comprises two crank discs (14) connected with each other via a crankpin (16) with a second central axis (B). At least one crank disc (14) has a recess (26) with a planar bottom surface (28), wherein the recess (26) is adapted in the at least one crank disc (14) in such a way that the second central axis (B) of the crankpin (16) cuts the planar bottom surface (28). That planar bottom surface (28) is oriented at a right angle in relation to the direction of the second central axis (B) of the crankpin (16). A bore (30) with a third central axis (C) extend through the planar bottom surface (28) of the recess (26), through the at least one crank disc (14), and into the at least one crankpin (16). Also, a combustion engine (2), a vehicle (1) and a method for manufacture of a crankshaft (4) are disclosed.

13 Claims, 6 Drawing Sheets

(56) References Cited

U.S. PATENT DOCUMENTS

| | | | |
|---|---|---|---|
| 2012/0024105 A1 | 2/2012 | Ohnuma et al. | 74/605 |
| 2016/0084295 A1* | 3/2016 | Murrish | B22C 9/103 |
| | | | 74/603 |

FOREIGN PATENT DOCUMENTS

| | | | | |
|---|---|---|---|---|
| DE | 694711 C | | 8/1940 | |
| DE | 2157916 A1 | * | 5/1973 | ............... F16C 3/14 |
| DE | 43 25 722 A1 | | 2/1995 | |
| DE | 10038612 C1 | * | 1/2002 | ............... F16C 3/14 |
| DE | 10 2011 014 310 A1 | | 9/2012 | |
| DE | 102011014310 A1 | * | 9/2012 | ............... F16C 3/08 |
| EP | 2 565 473 A1 | | 3/2013 | |
| FR | 761 148 | | 3/1934 | |
| GB | 574563 | | 1/1946 | |
| JP | 59009310 A | * | 1/1984 | ............... F16C 3/14 |
| JP | S60-88214 A | | 5/1985 | |
| SE | 537 746 C2 | | 10/2015 | |
| WO | WO 2015/094091 A1 | | 6/2015 | |

OTHER PUBLICATIONS

Machine translation of DE 102011014310 A1 obtained on Jul. 20, 2020.*
Novelty Search Report dated Nov. 18, 2016.
Office Action dated Dec. 6, 2017 in corresponding Swedish Patent Application No. 1750715-3.
Office Action dated Jul. 4, 2018 in corresponding Swedish Patent Application No. 1750715-3.
International Search Report dated Jul. 4, 2018 in corresponding PCT International Application No. PCT/SE2018/050535.
Written Opinion dated Jul. 4, 2018 in corresponding PCT International Application No. PCT/SE2018/050535.
European Search Report, dated Nov. 20, 2020, issued in corresponding European Patent Application No. 18814025.5. Total 10 pages.

* cited by examiner

CRANKSHAFT AND METHOD OF MANUFACTURING A CRANKSHAFT

CROSS-REFERENCE TO RELATED APPLICATIONS

The present application is a 35 U.S.C. §§ 371 national phase conversion of PCT/SE2018/050535, filed May 29, 2018, the contents of which are incorporated herein by reference which claims priority of Swedish Patent Application No. 1750715-3, filed Jun. 7, 2017, the contents of which are incorporated by reference herein. The PCT International Application was published in the English language.

TECHNICAL FIELD

The invention relates to a crankshaft, a method of manufacturing such a crankshaft, a combustion engine comprising such a crankshaft, and a vehicle comprising such a combustion engine.

BACKGROUND AND PRIOR ART

A piston engine, such as a combustion engine, may include a crankshaft which converts the backward and forward movement of one or more pistons, and thus the crank rods of the engine, into a rotating movement of the crankshaft, or vice versa. The crankshaft may include one or several crankshaft webs, each of which may be connected to at least one crank rod of a cylinder in the engine. For example, a six-cylinder piston engine may thus have a crankshaft with six crankshaft webs.

Each crankshaft web may comprise two crank discs, which are connected with each other via a crankpin. The piston may be connected to the crankshaft via the crankpin. Each crankpin may have a connecting rod bearing, such as a plain bearing, at which the crank rod rotates.

Between each crankshaft web, the crankshaft may have main bearing journals, which may be arranged coaxially with the central axis of the crankshaft, around which the crankshaft rotates. The main bearing journals may have main bearings arranged in connection with the crank house, in which the crankshaft is arranged. The crankshaft may rotate at the main bearings, which thus may absorb the forces arising between the crankshaft and the crank house.

Usually, there may be a main bearing journal comprising a main bearing at each end of the crankshaft and one between each crankshaft web. Today, efforts are made to minimize the weight of vehicles in order to e.g. reduce fuel consumption. Accordingly, it may also be desirable to manufacture engines that are as light as possible. Different ways of reducing the weight of an engine by reducing the weight of the crankshaft have been proposed in prior art.

Document US20120024105 A1 discloses a method of manufacturing a light crankshaft, wherein the crankshaft is adapted with recesses and bores in its crankpins. The bores and recesses are obtained by way of forging and stamping. Similarly, document DE4325722 A1 discloses how a crankshaft is adapted with recesses in its crankpins, with the objective of reducing the weight. Document WO2015/094091 discloses a crankshaft wherein at least one crank disc may have a recess with a planar bottom surface, and wherein at least one main bearing journal may have a hole that may extend coaxially with the central axis of the bearing journal and through the planar bottom surface of the recess.

SUMMARY OF THE INVENTION

There is a need to further develop a light crankshaft and a method of manufacturing a light crankshaft that is simple and cost effective.

One objective of the invention is to achieve a crankshaft with a reduced weight.

Another objective of the invention is to achieve a crankshaft with a good flexural and torsional strength.

Another objective of the invention is to achieve a crankshaft which facilitates boring of bores in the crankshaft.

Another objective of the invention is to achieve a method of manufacturing a crankshaft, which method is simple, time-efficient and cost effective.

Another objective of the invention is to achieve a method of manufacturing a crankshaft, which allows for good precision and accuracy, and which minimizes the need for finishing works and balancing.

These objectives may be achieved with a crankshaft, with a method of manufacturing a crankshaft, with a combustion engine comprising such a crankshaft, and with a vehicle comprising such a combustion engine according to the disclosure herein.

According to one aspect of the invention, a crankshaft with a first central axis may be provided, wherein the crankshaft may comprise at least two main bearing journals, through which the first central axis extends. At least one crankshaft web is arranged between the main bearing journals. The at least one crankshaft web may comprise two crank discs connected with each other via a crankpin with a second central axis. At least one crank disc may have a recess with a planar bottom surface. The recess may be adapted in the at least one crank disc in such a way that the second central axis of the crankpin cuts the planar bottom surface. The planar bottom surface may be at a right angle in relation to the direction of the second central axis of the crankpin. A bore with a third central axis may extend through the planar bottom surface of the recess, through the at least one crank disc, and into the at least one crankpin.

By adapting at least one crank disc with a recess with a planar bottom surface in such a way that the second central axis cuts the planar bottom surface, a crankshaft may be achieved, which may be well suited for and facilitates drilling of so-called light bores. Light bores may be adapted with the objective of reducing the weight of a detail. Furthermore, through the recess, a reduction of the weight of the at least one crank disc, and thus of the crankshaft, may be achieved. The recess in the at least one crank disc may be adapted in such a way that the flexural and torsional strength of the crank disc, and thus the crankshaft, may be maintained. All crank discs in the crankshaft may have a recess with a planar bottom surface. In this manner, the weight of the crankshaft is further reduced. At least one crank disc in the crankshaft may have a counterweight.

By adapting at least one crankpin with a bore, which may extend into the crankpin, the crankshaft's weight may be reduced. Several crankpins or all crankpins of the crankshaft may have a bore which may extend into the crankpin. Accordingly, a light crankshaft may be provided. The advantages with a low-weight crankshaft include a reduction in weight of the vehicle in which the combustion engine with the crankshaft is arranged. Thus the vehicle's fuel consumption may be reduced.

Bores may be drilled in the counterweight to balance the crankshaft. Several of the crank discs may have a counterweight.

The crank discs may be designed with different chamfering and levels, and may have oblique surfaces. The surface that the drill hits may be oblique or uneven. Accordingly, the drill's entry into the crank discs may have an oblique surface. This may entail that the drilled bore becomes oblique and may also lead to increased friction, wear or even failure of the drill. At further drilling there may also be a risk that the subsequent bores may become increasingly oblique. Oblique bores in crankpins and crankshaft webs may entail an imbalance in the crankshaft, which in turn may lead to an increased need for balancing the crankshaft. If the drill drills obliquely and passes the surface at an oblique angle, the occurrence of burrs may also increase, which may entail an increased need for after-processing. By adapting recesses with a planar bottom surface, which may be at a right angle against the direction of the second central axis of the crankpins, in such a way that the second central axis cuts the planar bottom surface in at least one crank disc, this may facilitate the drilling of bores through this crank disc. The planar bottom surface of the recess may therefore constitute the surface through which the drill is drilled. Since the bottom surface may be planar and may be at a right angle in relation to the direction of the second central axis of the crankpins, the drilling method for the crankpins in the crankshaft may be facilitated, and the risk of the drilled bore becoming oblique may be minimized.

The crankpin of the at least one crankshaft web may have a connecting rod bearing. All the crankpins of the crankshaft may have connecting rod bearings. Furthermore, the at least two main bearing journals may have main bearings at which the crankshaft rotates around the first central axis. All main bearing journals of the crankshaft may have main bearings. At least one main bearing journal may have a hole which may extend coaxially with the first central axis. This hole may be referred to as a light bore.

According to a further aspect of the invention, the recess may be provided in one side of the at least one crank disc, that side facing away from the at least one crankpin. This may facilitate the access to the recess for a drill when drilling the bore through the at least one crank disc and into the at least one crankpin. The recess in the at least one crank disc may be adapted in such a way that the flexural and torsional strength of the crank disc, and thus of the crankshaft, may be maintained.

The bottom surface of the recess may have a shape and an area that may exceed the cross-sectional shape and surface of the bore. Therefore, the bottom surface of the recess may occupy an area, which may contain the entire cross-sectional area of the bore in the at least one crank disc. Two crankshaft webs arranged next to each other may be offset around the first central axis in relation to each other. This may facilitate the access to the recess for a drill when drilling the bore through the at least one crank disc and into the at least one crankpin.

According to a further aspect of the invention the third central axis of the bore may extend in an angle in relation to the second central axis of the crankpin. At least one main bearing journal in the crankshaft may comprise an oil conduit hole for oil supply. The oil conduit hole may be connected with the crankpin of a crankshaft web arranged next to the at least one main bearing journal. A third central axis of the bore made in the at least one crankpin may extend at an angle in relation to the second central axis of the crankpin, so that the bore may be separated from the oil conduit hole.

According to a further aspect of the invention the angle between the second and third central axes is 0°-20°. When the angle between the second and third central axes is in the range of 0°-20°, the bore may be separated from the oil conduit hole. Also, when the angle between the second and third central axes is in the range of 0°-20°, the drilling of the bore may be facilitated since the drill may not be in conflict with other crank webs of the crankshaft. The angle between the second and third central axes also depends on the angular direction of the planar bottom surface of the recess.

According to a further aspect of the invention, all of the crankpins may have bores extending into the respective crankpin. This may further reduce the weight of the crankshaft. Also, the balance of the crankshaft may be increased if all the crankpins may have bores extending into the respective crankpin.

According to a further aspect of the invention, the at least one main bearing journal may have a hole that extends coaxially with the first central axis. This may further reduce the weight of the crankshaft.

According to a further aspect of the invention, the crankshaft may comprise at least five crankshaft webs. The crankshaft may be adapted to a straight engine with five or six cylinders, and thus comprise five or six crankshaft webs. Alternatively, the crankshaft may be adapted to a so-called V engine with six cylinders, and thus comprise six crankshaft webs.

According to a further aspect of the invention, at least one of the two crank discs, of all crankshaft webs of the crankshaft, may be provided with a recess with a planar bottom surface. The planar bottom surface of all recesses may be directed in the same direction. This may facilitate access to the recesses for a drill when drilling the bore through the crank discs and into the crankpins.

According to one aspect of the invention, a method is provided for manufacture of a crankshaft with a first central axis, wherein the crankshaft may comprise at least two main bearing journals, through which the first central axis may extend, and at least one crankshaft web may be arranged between the main bearing journals, wherein the at least one crankshaft web may comprise two crank discs connected with each other through a crankpin having a second central axis. The method may comprise the step of forming a recess with a planar bottom surface, which may be at a right angle in relation to the second central axis of the crankpin, in at least one crank disc, wherein the recess may be adapted in such a way that the second central axis of the crankpin cuts the planar bottom surface. The recess may be formed by providing a crankshaft forging tool comprising two tool halves, wherein one of the tool halves may be adapted with at least one protrusion. A raw material may be applied between the tool halves and the tool halves are pressed together, so that the at least one protrusion of one of the tool halves may form the recess of the at least one crank disc in the crankshaft. The raw material of which the crankshaft may be manufactured may consist of forged steel. The tool halves may be adapted with a clearance angle. Accordingly, the bottom surface of the formed recess may potentially need to be finished, so that the bottom surface may become planar and may be at a right angle in relation to the second central axis.

By forging the crankshaft in one piece and, while forging, forming the recess of the at least one crank disc, a method is achieved of manufacturing a crankshaft which may be simple, time-efficient and cost effective. Furthermore, a crankshaft with good strength may be achieved. The protrusion in the one tool half may have a shape corresponding to the recess with the planar bottom surface. When the tool halves are pressed together, the protrusion may displace the raw material, and as a result, the recess may be formed. The forging may be carried out in two steps, in accordance with prior art. After the forging, the crankshaft may be suitably finished.

By using a crankshaft-forging tool comprising two tool halves, a splice may be achieved between the tool halves, a so-called parting line. At the splice, the raw material may be pressed out, which may entail a need for finishing in order to remove superfluous material. At the finishing, the area at the parting line may obtain a somewhat impaired surface finish. The area around the parting line may also be allowed to have larger measurement deviations. Achieving the recess of the at least one crank disc with a protrusion in one of the tool halves, may ensure that the recess is formed in the crank disc at a position separate from the splice between the tool halves. Accordingly, a protrusion with a planar bottom surface with a good surface finish may be achieved. The crankshaft-forging tool may be adapted with several protrusions, so that the protrusions may form recesses with a planar bottom surface in several crank discs, when the tool halves are pressed together. Only one of the tool halves may have a protrusion. Alternatively, both tool halves may have protrusions. The tool halves may be adapted with a clearance angle in relation to the forging direction.

Alternatively, the recess may be formed by casting the crankshaft with a crankshaft mold, comprising at least one protrusion, which at the casting forms the recess in the at least one crank disc of the crankshaft. At casting, raw material may be added to the crankshaft mold via an opening in the mold. The crankshaft mold may consist of a sand mold. In case the recess may be adapted with a clearance angle at casting, the bottom surface of the recess formed may be finished in such a way that the bottom surface may become planar and may be at a right angle in relation to the second central axis.

Alternatively, the recess may be shaped by first forging the crankshaft with a crankshaft-forging tool and, retrospectively, forming the recess with the planar bottom surface of the at least one crank disc by machining. Machining may e.g. relate to drilling, turning, planing, chipping, grinding or milling.

The method may also comprise to drilling a bore through the at least one crank disc with the recess, so that the drilled bore may extend through the planar bottom surface of the recess and into the crankpin. The drilled bore may be adapted in such a way that its cross-sectional surface fits within the bottom surface of the recess.

The method comprises drilling a bore through the at least one crank disc with the recess, so that the drilled bore may extend through the planar bottom surface of the recess and into the crankpin. By drilling a bore through one or several crankpins and at least one crank disc, the weight of the crankshaft may be reduced. Since the at least one crank disc may have a recess with a planar bottom surface, which may be at a right angle in relation to the direction of the second central axis, the drilling through the at least one crank disc may be facilitated. The method may comprise drilling the bore at an angle in relation to the second central axis of the crankpin. At least one main bearing journal in the crankshaft may comprise an oil conduit hole for the oil supply. The oil conduit hole may be connected with the crankpin of a crankshaft web arranged next to the at least one main bearing journal. A third central axis of the bore made in the at least one crankpin may extend at an angle in relation to the second central axis of the crankpin, so that the bore may be separated from the oil conduit hole. Drilling the bore at an angle in relation to the second central axis of the crankpin may also facilitate the access to the recess for a drill when drilling the bore through the at least one crank disc and into the at least one crankpin.

Drilling may be carried out into several crankpins and crank discs, wherein at least one of the two crank discs, of all crankshaft webs of the crankshaft, may be provided with a recess with a planar bottom surface. The drilling may be carried out with starting from one end of the crankshaft, drilling a bore through one crank disc and into a crankpin, and further through the crank discs and the crankpins in a direction towards the other end. Alternatively, the drilling may be carried out starting from both ends of the crankshaft, in a direction towards each opposite end. The drill will hit the planar bottom surface of the respective crank disc, entailing that the risk of the bore becoming oblique may be minimized. Furthermore, drill bit wear and the occurrence of burrs may be minimized.

Further, the method may comprise finishing of the crankshaft and balancing of the crankshaft. Balancing of the crankshaft may be achieved by drilling holes in one or several crank discs. Alternatively, the balancing may be achieved by adding material to one or several crank discs.

The crankshaft according to the invention may be arranged in an engine, which may e.g. be used as an industrial engine, in motor-powered industrial robots or in different types of power plants, such as an electric power plant comprising a diesel generator.

Additional objectives, advantages and novel features of the invention will be apparent to one skilled in the art from the following details, and through exercising the invention. While the invention is described below, it should be apparent that the invention is not limited to the specifically described details. One skilled in the art, having access to the teachings herein, will recognize additional applications, modifications and incorporations in other areas, which are within the scope of the invention.

BRIEF DESCRIPTION OF THE DRAWINGS

Below is a description, as an example, of preferred embodiments with reference to the enclosed drawings, in which.

DETAILED DESCRIPTION OF THE DRAWINGS

Figure 1:
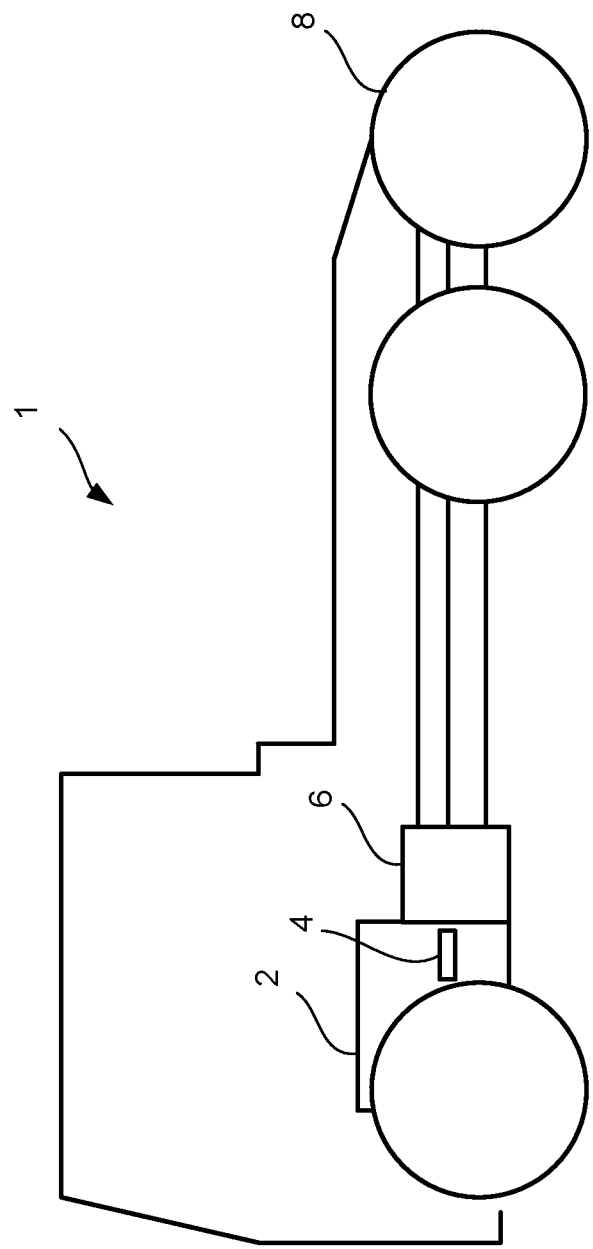
FIG. 1 shows a schematic side view of a vehicle.

For the sake of clarity, some reference numerals have been omitted from the drawings, regarding details displayed several times in the same figure, and/or in several different figures.

FIG. 1 shows a schematic side view of a vehicle 1. The vehicle 1 may comprise a combustion engine 2, which may comprise a crankshaft 4 according to an embodiment. The combustion engine 2 may be connected to a gearbox 6 via the crankshaft 4, which may further be connected to the vehicle's driving wheels 8 via a transmission. The vehicle 1 may be a heavy goods vehicle, such as a truck, bus, wheel loader, forest machine, dumper, mining machine, tracked vehicle or tank. The vehicle 1 may also be a car.

Figure 2:
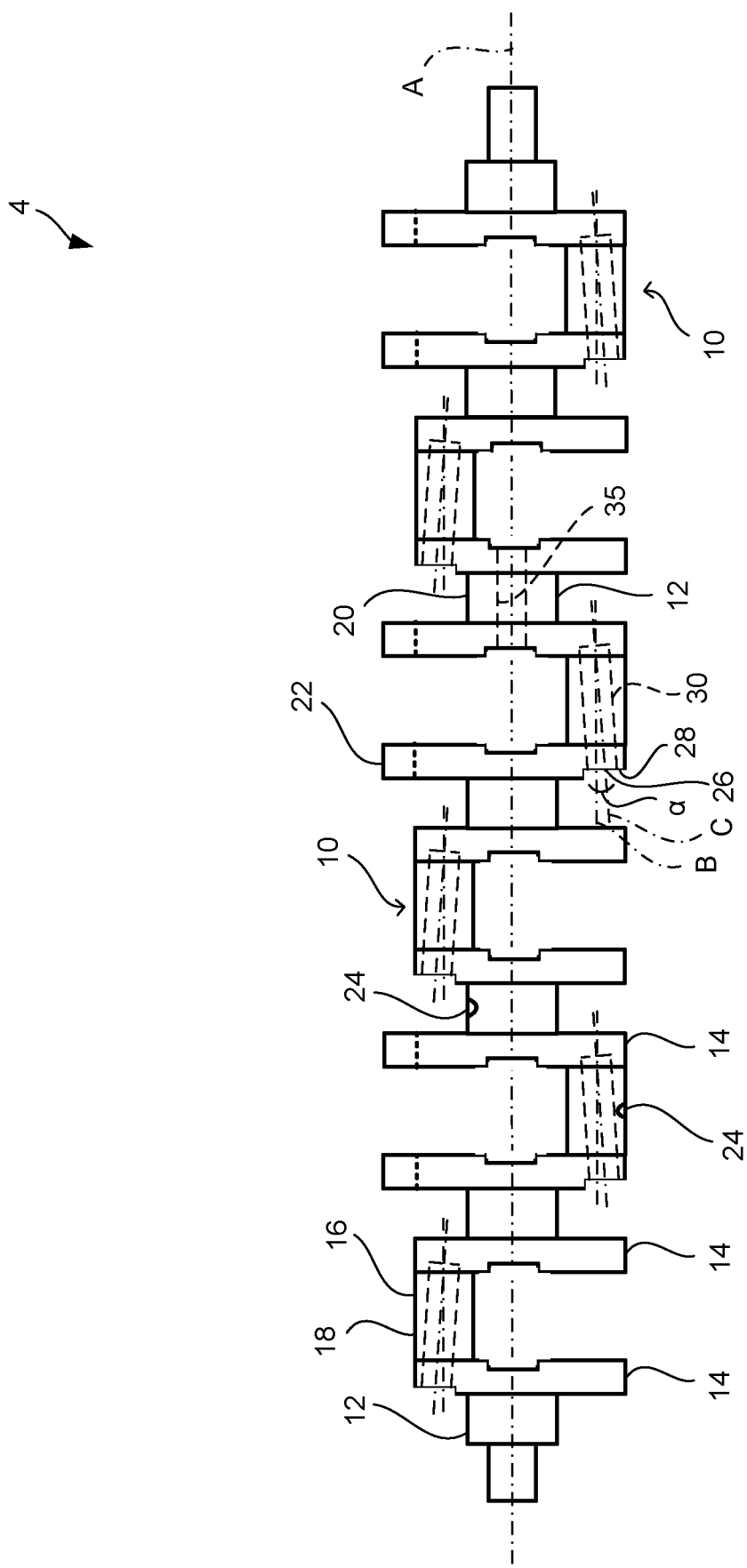
FIG. 2 schematically shows a crankshaft according to an embodiment.

FIG. 2 schematically shows a crankshaft 4 according to one embodiment. The crankshaft 4 may comprise six crankshaft webs 10 arranged next to each other along a first central axis A, around which the crankshaft 4 rotates. Two crankshaft webs 10 arranged next to each other may be offset around the first central axis A in relation to each other. For example, two crankshaft webs 10 arranged next to each other may be offset 120 degrees around the first central axis A in relation to each other. Embodiments are described below in connection with a crankshaft with such a twisting of crankshaft webs 10. The crankshaft 4 may have a main bearing journal 12 at each end and a main bearing journal 12 between each crankshaft web 10. Each crankshaft web 10 may comprise two crank discs 14, which are connected to each other via a crankpin 16. The crankpin 16 in each crankshaft web 10 may be parallel to and separated from the first central axis A. Around each crankpin 16, a connecting rod bearing 18 may be arranged in the form of a plain bearing, on which the crank rods (not displayed) of the combustion engine 2 are mounted. Around each main bearing journal 12, a main bearing 20 may be arranged, on which the crankshaft 4 may be mounted in the engine block (not displayed). The crankshaft webs 10 may comprise crank discs 14 with counterweights 22, in order to counteract imbalance of the crankshaft 4. Furthermore, the crankpins 16 and the main bearing journals 12 may have oil conduit holes 24 for supply of oil and lubrication.

The crank discs may be provided with recesses 26, which may have a planar bottom surface 28. The recesses may be provided in the crank discs 14 in such a way that a second central axis B of the crankpin 16 cuts the planar bottom surface 28 of the recess 26. The planar bottom surface 28 may be oriented at a right angle in relation to the direction of the second central axis B of the crankpin 16. Bores 30 with a third central axis C may extend through the planar bottom surface 28 of each recess 26, through one of the crank discs 14 connected to the crankpin 16, and into the crankpin 16. Every second crank disc and six crankpins may have bores extending through the crank disc and into the crankpin. Each recess 26 may be adapted in the side of the crank disc 14, so it is facing away from the at least one crankpin 16. The planar bottom surface 28 of all recesses 26 may be directed in the same direction of the crankshaft. In FIG. 2 all the crankpins 16 may have bores 30 extending into the respective crankpin 16. However, only some of the crankpins 16 may be provided with bores 30. The third central axis C of the bore 30 may extend at an angle α in relation to the second central axis B of the crankpin 16. The angle α may be 0°-20°, depending on the angular direction of the planar bottom surface 28 of the recess 26.

The crank discs 14 may also have further recesses in the crank discs 14 adapted so that they face each other, that is, the recesses 26 may be adapted on the side of a crank disc 14, which faces the other crank disc 14 in the adjacent crankshaft web 10.

At least one main bearing journal 12 may be provided with a hole 35 which may extend coaxially with the first central axis A in order to further decrease the weight of the crankshaft 4.

Figure 3:
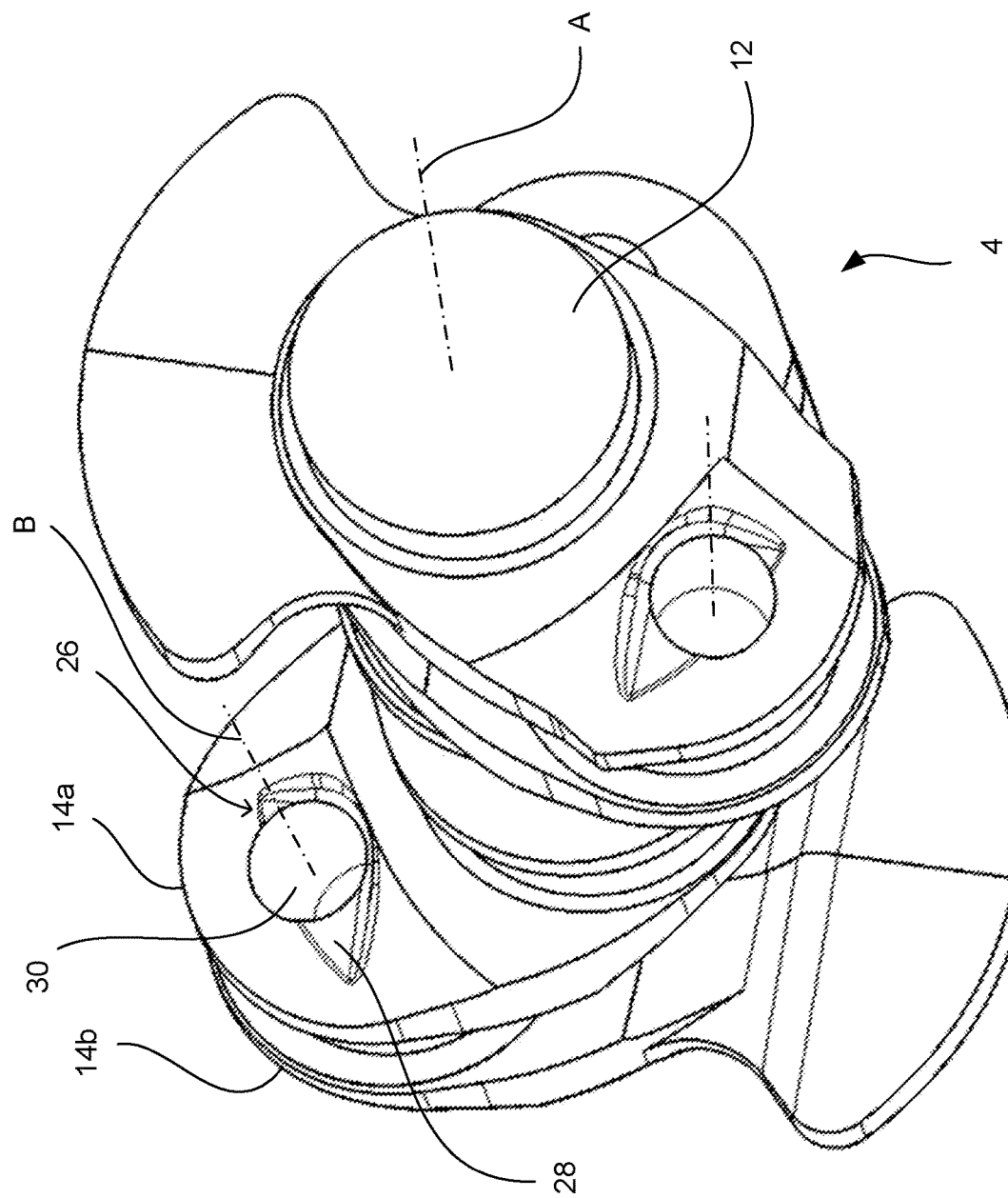
FIG. 3 schematically shows a view in perspective of three crank shaft webs according to an embodiment.

FIG. 3 schematically shows three crank webs 10 that are angularly offset in relation to each other according to one embodiment. One of the crank discs 14a connected to the crankpin may be arranged without any counterweight 22, and the other crank disc 14b connected to the crankpin may be provided with a counterweight 22. The crank discs 14a, 14b may each have a recess 26 with a planar bottom surface 28, which may be at a right angle to the direction of the second central axis B of the crankpin 16. The recesses 26 may be adapted in the crank discs 14a, 14b in such a way that the second central axis B may cut the planar bottom surface 28 of the recess 26. The crank discs 14a, 14b may have bores 30 through each planar bottom surface 28, and through the crank disc 14a, 14b. The bores 30 may extend through the entire crank disc 14a and further into the crankpin 16 arranged in connection with the crank disc 14a. The bores 30 may be adapted in such a way that their cross-sectional area fits in the bottom surface 28 of each recess 26. Only one of the two crank discs 14a, 14b, of all crankshaft webs 10 of the crankshaft 4, may be provided with a recess 26 with a planar bottom surface 28. The planar bottom surfaces 28 of all recesses 26 may be directed in the same direction. This may facilitate the access to the recesses 26 for a drill when drilling the bores 30 through the crank discs 14a, 14b and into the crankpins 16.

Figure 4:
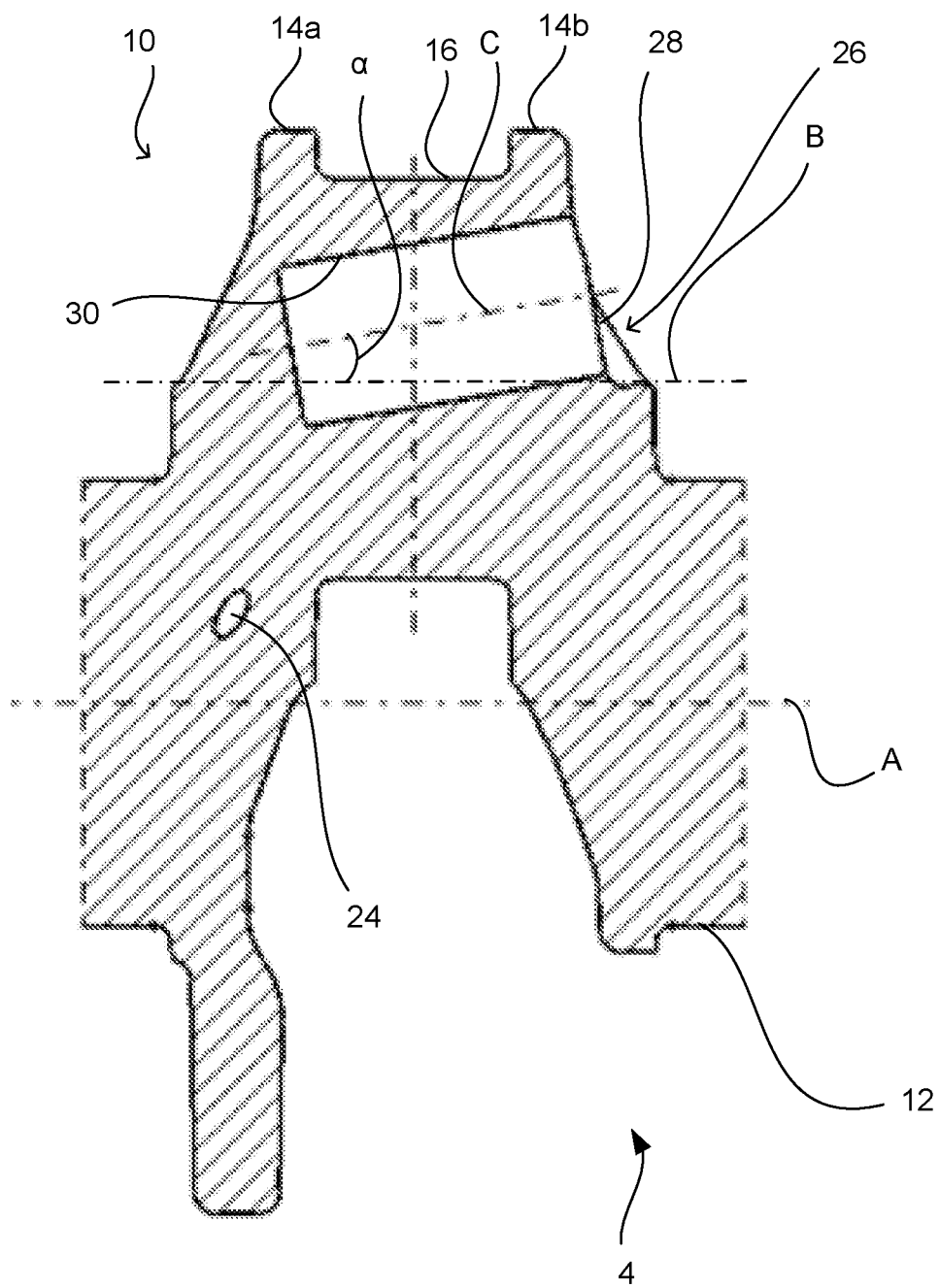
FIG. 4 schematically shows a section view of a crank shaft webs according to an embodiment.

FIG. 4 schematically shows a section view of a crank shaft web 10 according to an embodiment. One of the crank discs 14a connected to the crankpin 16 may be arranged without any counterweight 22, and the other crank disc 14b connected to the crankpin 16 may be provided with a counterweight 22. The recess 26 may be adapted in one side of the at least one crank disc 14a, 14b, facing away from the at least one crankpin 10. This may facilitate the access to the recess 26 for a drill when drilling the bore through the at least one crank disc 14a, 14b and into the at least one crankpin 16. The recess 26 in the at least one crank disc 14a, 14b may be adapted in such a way that the flexural and torsional strength of the crank disc 14a, 14b, and thus the crankshaft 4, may be maintained. The third central axis C of the bore may extend in the angle α in relation to the second central axis B of the crankpin 16. At least one main bearing journal 12 in the crankshaft 4 may comprise an oil conduit hole 24 for oil supply. The oil conduit hole 24 may be connected with the crankpin 16 of a crankshaft web 10 arranged next to the at least one main bearing journal 12. A third central axis of the bore 30 made in the at least one crankpin 16 may extend at an angle in relation to the second central axis B of the crankpin 16, so that the bore 30 may be separated from the oil conduit hole 24.

Figure 5A:
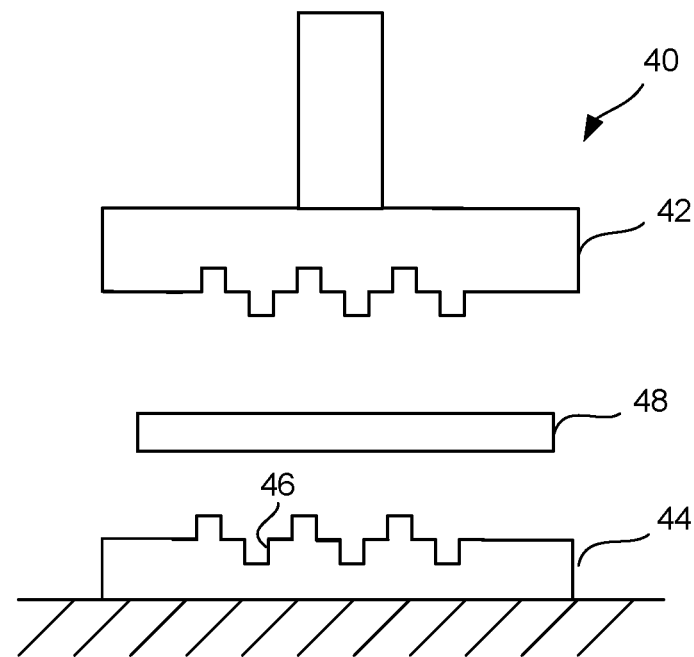
FIG. 5a schematically shows a crankshaft-forging tool to achieve a crankshaft according to one embodiment.

FIG. 5a shows a crankshaft-forging tool 40 to achieve a crankshaft 4, according to one embodiment. The crankshaft-forging tool 40 may comprise two tool halves 42, 44, of which one of the tool halves 44 may have at least one protrusion 46. At the manufacture of a crankshaft 4 through forging, the raw material 48, such as forging steel, may be placed, between the tool halves 42, 44. Subsequently, the tool halves 42, 44 may be pressed together and the raw material 48 may be shaped according to the design of the tool halves 42, 44. The method of manufacturing the crankshaft 4 with the crankshaft-forging tool 40 is further described below, with reference to FIG. 6b. The at least one protrusion 46 of one of the tool halves 44 may be adapted in such a way that it entails achieving a recess 26 in the at least one crank disc 14 of the crankshaft 4. Furthermore, the protrusion 46 may be adapted in such a way that the recess 26 formed may have a planar bottom surface 28, which may be at a right angle in relation to the direction of the second central axis B of the crankpin 16, and in such a way that the second central axis B of the crankpin 16 may cut the planar bottom surface 28 of the formed recess 26. Accordingly, the second central axis B of the crankpin 16 may form a normal to the planar bottom surface 28 of the recess 26. However, the normal to the planar bottom surface 28 of the recess 26 may have a different direction in relation to the second central axis B of the crankpin 16.

Figure 5B:
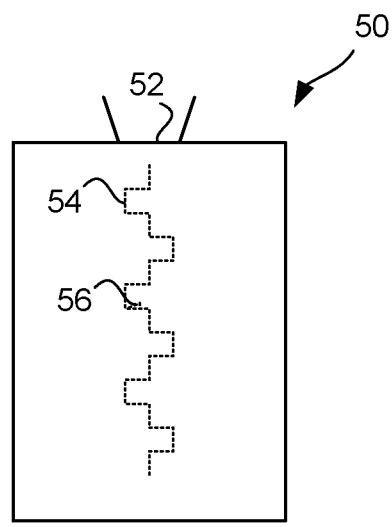
FIG. 5b schematically shows a crankshaft mold to achieve a crankshaft according to one embodiment.

FIG. 5b shows a crankshaft mold 50 for achieving a crankshaft 4 according to one embodiment. The crankshaft mold 50 may comprise an opening 52 and a hollow 54, wherein raw material may be supplied to the crankshaft mold via the opening 52, into the hollow 54. The crankshaft mold 50 may comprise at least one protrusion 56, which at the casting forms a recess 26 in at least one crank disc 14 of the crankshaft 4. The protrusion 56 may be adapted in such that the recess 26 formed may have a planar bottom surface 28, which may be at a right angle in relation to the direction of the second central axis B of the crankpin 16, and in such a way that the second central axis B of the crankpin 16 may cut the planar bottom surface 28 of the formed recess 26. (see also FIG. 6b).

Figure 6A:
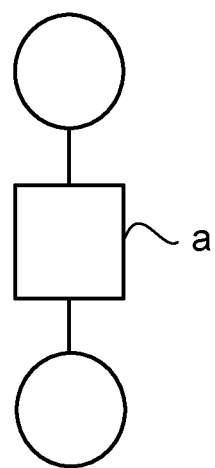
FIG. 6a shows a flow chart for a method of manufacturing a crankshaft, according to one embodiment.

FIG. 6a shows a flow chart for a method of manufacturing a crankshaft 4, according to one embodiment. The flow chart shows a method for manufacture of a crankshaft 4 with a first central axis A, wherein the crankshaft 4 may comprise at least two main bearing journals 12 and at least one crankshaft web 10 arranged between the main bearing journals 12, wherein the at least one crankshaft web 10 may comprise two crank discs 14 connected with each other through a crankpin 16. The method may comprise the step of a) forming a recess 26 with a planar bottom surface 28, which may be at a right angle in relation to the first central axis A, in at least one crank disc 14, wherein the recess 26 may be adapted in such that the second central axis B of the crankpin 16 may cut the planar bottom surface 28. The recess 26 may be formed with different manufacturing methods, of which some examples are described in FIG. 6b.

Figure 6B:
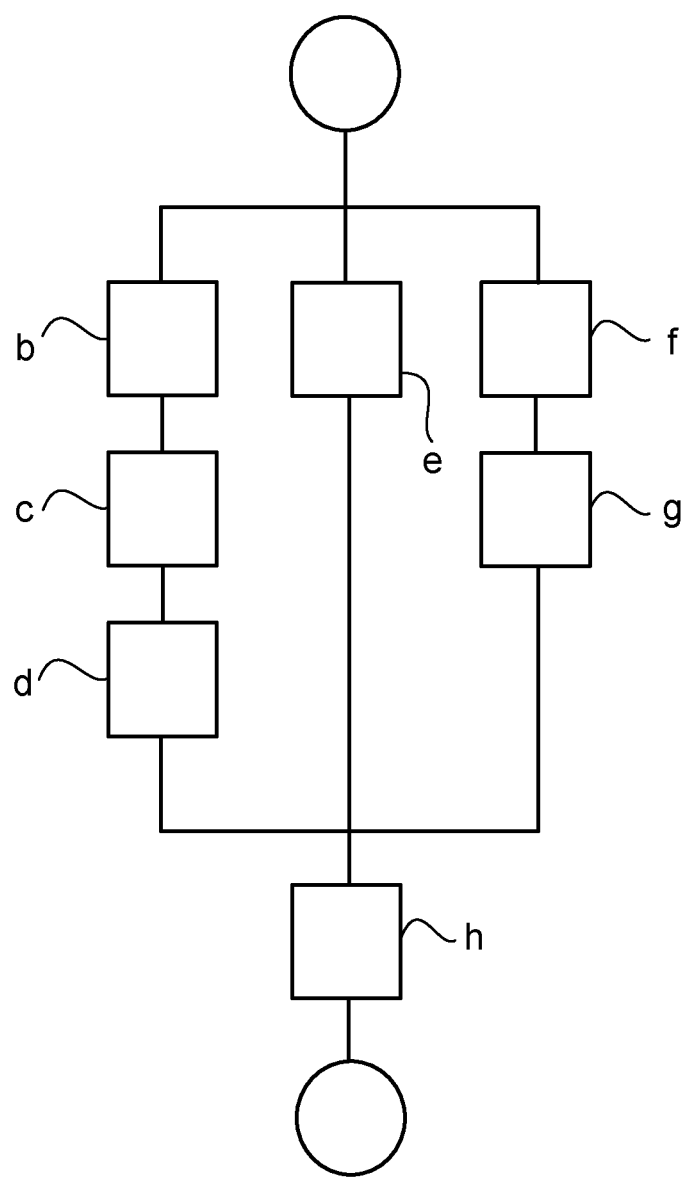
FIG. 6b shows a flow chart for a method of manufacturing a crankshaft, according to one embodiment.

FIG. 6b shows a flow chart for a method for manufacture of a crankshaft 4 with a first central axis A, wherein the crankshaft 4 may comprise at least two main bearing journals 12 and at least one crankshaft web 10 arranged between the main bearing journals 12, wherein the at least one crankshaft web 10 may comprise two crank discs 14 connected with each other through a crankpin 16.

The method may comprise the step of b) providing a crankshaft-forging tool 40, comprising two tool halves 42, 44 (see FIG. 5a), wherein one of the tool halves 44 may be adapted with at least one protrusion 46. After step b), step c) is carried out, at which a raw material 48 may be applied between both tool halves 42, 44 and, subsequently, step d) may be carried out, at which the two halves 42, 44 may be pressed together, so that the protrusion 46 may form a recess 26 in at least one crank disc 14 of the crankshaft 4. Herein the recess 26 may have a planar bottom surface 28, which may be at a right angle in relation to the first central axis A, and herein the recess 26 may be adapted in such a way that the second central axis B of the crankpin 16 may cut the planar bottom surface 28. In case the tool halves 42, 44 are adapted with a clearance angle, the bottom surface 28 of the formed recess 26 may potentially need to be finished, so that the bottom surface 28 becomes planar, and may be at a right angle in relation to the second central axis B of the crankpin 16.

Alternatively, the method may comprise the step of e) casting the crankshaft 4 with a crankshaft mold 50 (see FIG. 5b, which comprises at least one protrusion 56), which at the casting may form a recess 26 in at least one crank disc 14 of the crankshaft 4. Herein the recess 26 may have a planar bottom surface 28, which may be at a right angle in relation to the first central axis A, and herein the recess 26 may be adapted in such a way that the second central axis B of the crankpin 16 cuts the planar bottom surface 28. If the recess 26 is formed with a clearance angle at the casting, the bottom surface 28 of the recess 26 may be finished, so that the bottom surface 28 becomes planar and may be at a right angle in relation to the second central axis B of the crankpin 16.

Alternatively, the method may comprise the steps of f) forging the crankshaft 4 with a crankshaft-forging tool, and g) forming a recess 26 in at least one crank disc 14 of the crankshaft 4 by means of machining. Herein the recess 26 has a planar bottom surface 28, which may be at a right angle in relation to the first central axis A, and herein the recess 26 may be adapted in such a way that the second central axis B of the crankpin 16 may cut the planar bottom surface 28. Machining may e.g. relate to drilling, turning, planing, chipping, grinding or milling.

After step d), e) or f) the step h) is carried out. A bore 30 may be drilled, which may extend coaxially with the second central axis B of the at least one crankpin 16 through the at least one crank disc 14 with the recess 26, so that the drilled bore 30 may extend through the planar bottom surface 28 and further into the crankpin 16. By drilling a bore 30 into at least one crankpin 16 and the at least one crank disc 14, a reduction of the weight of the crankshaft 4 may be achieved. Since the recess 26 has a planar bottom surface 28, which may be at a right angle in relation to the second central axis B, the risk of the drilled bore 30 becoming oblique may be minimized, as is any drill bit wear. Furthermore, the need for finishing may be reduced, since the occurrence of burrs may be minimized. The bottom surface 28 of the recess 26 may have a shape and an area which may exceed the cross-sectional shape and surface of the bore 30. That mean that, the bottom surface 28 of the recess 26 occupies an area in the at least one crank disc 14, into which the entire cross-sectional area of the bore 30 may fit. The method may be completed after step h).

According to the embodiments, the step h) may include drilling of a bore 30, into all crankpins 16 and all crank discs 14, 14a, 14b of the crankshaft 4.

The foregoing description of the preferred embodiments has been furnished for illustrative and descriptive purposes. It is not intended to be exhaustive, or to limit the embodiments to the variants described. Many modifications and variations will obviously be apparent to one skilled in the art. The embodiments have been chosen and described in order to best explicate principles and practical applications, and to thereby enable one skilled in the art to understand the embodiments in terms of its various embodiments and with the various modifications that are applicable to its intended use. The components and features specified above may, within the framework of the embodiments, be combined between different embodiments specified.

The invention claimed is:

1. A crankshaft with a first central axis (A), wherein the crankshaft comprises:
   at least two main bearing journals, through which the first central axis (A) extends;
   at least one crankshaft web arranged between the main bearing journals, wherein the at least one crankshaft web comprises two crank discs and a crankpin connecting the two crank discs with each other;
   the crankpin has a second central axis;
   at least one crank disc of the two crank discs has a recess with a planar bottom surface, wherein the recess is configured in the at least one crank disc in such a way that the second central axis (B) of the crankpin cuts the planar bottom surface; and the planar bottom surface is oriented at a right angle in relation to direction of the second central axis (B) of a crankpin bore with a third central axis (C) that extends through the planar bottom surface of the recess, through the at least one crank disc, and into the crankpin, wherein the third central axis is oriented at an oblique angle relative to the first central axis, wherein the third central axis (C) of the bore extends at an oblique angle (α) relative to the second central axis (B) of the crankpin, and wherein the angle (α) is more than 0° and up to 20°.

2. The crankshaft according to claim 1, wherein the recess is adapted in one side of the at least one crank disc, facing away from the crankpin.

3. The crankshaft according to claim 1, further comprising a plurality of crankpins in addition to the crankpin each of the plurality of crankpins having a bore there through.

4. The crankshaft according to claim 1, further comprising at least one of the main bearing journals has a hole that extends coaxially with the first central axis (A).

5. The crankshaft according to claim 1, wherein the crankshaft comprises at least four additional crankshaft webs.

6. A combustion engine comprising a crankshaft according to claim claim 1.

7. A vehicle comprising a combustion engine according to claim 6.

8. A method for manufacture of a crankshaft with a first central axis (A), wherein the crankshaft comprises:

at least two main bearing journals, through which the first central axis (A) extends, and at least one crankshaft web arranged between the main bearing journals, wherein the at least one crankshaft web comprises two crank discs connected with each other through a crankpin having a second central axis (B), the method comprising the steps of:

a) forming a recess with a planar bottom surface, which is at a right angle in relation to the second central axis (B) of the crankpin, in at least one crank disc of the two crank discs, wherein the recess is configured such that the second central axis (B) of the crankpin cuts the planar bottom surface, and h) drilling a bore, through the at least one crank disc with the recess, so that the drilled bore extends through the planar bottom surface of the recess and into the crankpin at an oblique angle (α) relative to the first central axis and the second central axis (B), wherein the bore is drilled to have a third central axis (C) that extends along a direction that is at the oblique angle (α) relative to the second central axis (B) of the crankpin, and wherein the angle (α) is more than 0° and up to 20°.

9. The method according to claim 8, wherein the recess is formed by the steps of:

b) providing a crankshaft-forging tool comprising two tool parts, wherein one of the tool parts is configured with at least one protrusion;

c) applying a raw material between both tool parts; and d) pressing together the tool parts, so that the protrusion forms the recess in the at least one crank disc of the crankshaft.

10. The method according to claim 8, wherein the recess is formed by the step of:

e) casting the crankshaft with a crankshaft mold, comprising at least one protrusion, and at the casting, the protrusion forms the recess in the at least one crank disc of the crankshaft.

11. The method according to claim 8, wherein the recess is formed by the steps of:

f) forging the crankshaft with a crankshaft-forging tool; and g) forming the recess in the at least one crank disc of the crankshaft by machining.

12. The method according to claim 8, further comprising drilling bores into all other crankpins of the crankshaft.

13. The method according to claim 8, wherein step h) includes drilling the bore at an angle in relation to the second central axis (B) of the crankpin.

* * * * *